Patented Dec. 10, 1935

2,024,008

UNITED STATES PATENT OFFICE 2,024,008

MANUFACTURE OF ANTIMONY TRIFLUORIDE

Thomas Midgley, Jr., Worthington, Albert L. Henne, Columbus, and Robert R. McNary, Dayton, Ohio, assignors, by mesne assignments, to General Motors Corporation, a corporation of Delaware No Drawing. Application February 26, 1931, Serial No. 518,490. Renewed June 30, 1934

4 Claims. (Cl. 23—98)

This invention relates to chemistry and chemical processes, and more particularly to the manufacture of antimony trifluoride.

Recently a group of compounds, known as the halo-fluoro derivatives of aliphatic hydrocarbons, of which dichlorodifluoromethane is a specific example, have become of importance due to their value as refrigerating agents and other uses. In the manufacture of these halo-fluoro derivatives it has been found that antimony trifluoride is an efficient fluorination agent. However, the cost of antimony trifluoride has been high, rendering the cost of the final halo-fluoro compounds higher than desired.

The objects of our present invention are to provide methods of manufacturing antimony trifluoride from an economical source so as to reduce its cost.

Our invention comprises interacting hydrofluoric acid with antimony trichloride to replace the chlorine with fluorine in the antimony compound.

As a specific example of our mode of carrying out our process, hydrofluoric acid is passed through a molten mass of antimony trichloride contained in a steam heated lead receptacle, or pot. The hydrofluoric acid converts the antimony trichloride into antimony trifluoride, the replaced chlorine atoms combining with the hydrogen atoms to produce hydrochloric acid which escapes from the top of the reaction chamber.

The reaction is represented by the following equation:

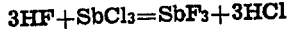

$$3HF + SbCl_3 = SbF_3 + 3HCl$$

As the conversion of the antimony trichloride into antimony trifluoride proceeds, the antimony trifluoride crystallizes out progressively. It tends to clog the hydrofluoric acid inlet and when its concentration has sufficiently built up, the whole mass conglomerates. These mechanical troubles stop the operation. The mixture of antimony trifluoride and antimony trichloride thus obtained is a satisfactory fluorinating agent. All the fluorine fixed on the antimony is used during the subsequent fluorination process. The resulting antimony trichloride may be retreated with hydrofluoric acid as previously described. However, if desired, the original conglomerate may be broken up and stirred so that the conversion to antimony trifluoride is carried to completion. However, we prefer to use the incompletely converted mixture as a fluorinating agent.

In the manufacture of halo-fluoro derivatives, for example, halo-fluoro derivatives of methane, such as dichlorodifluoromethane, the mixture obtained from the above reaction comprising antimony trichloride and antimony trifluoride is placed in an autoclave with a catalytic agent, such as antimony pentachloride. Carbon tetrachloride is admitted into the autoclave and fluorination takes place.

It will be seen that we have provided an economical method to render available fluorine in a state suitable for the fluorination of halo-derivatives of acyclic hydrocarbons and we so employ it.

What is claimed is as follows:

1. The method of manufacturing antimony trifluoride which consists in converting antimony trichloride into antimony trifluoride by the reaction thereon of hydrofluoric acid.

2. The method of manufacturing antimony trifluoride which consists in maintaining a quantity of antimony trichloride in a molten state and reacting it with hydrofluoric acid to partially convert the antimony trichloride into antimony trifluoride.

3. The method of manufacturing antimony trifluoride which consists in maintaining a quantity of antimony trichloride in the molten state and contacting therewith hydrofluoric acid to convert the antimony trichloride into antimony trifluoride.

4. The method of manufacturing $SbF_3$ which consists in maintaining antimony trichloride in a molten state and reacting it with hydrofluoric acid to convert a part of the antimony compound into antimony trifluoride and collecting the antimony trifluoride mixed with the antimony trichloride.

THOMAS MIDGLEY, JR.
ALBERT L. HENNE.
ROBERT REED McNARY.